United States Patent
Ward

(10) Patent No.: US 7,306,177 B2
(45) Date of Patent: Dec. 11, 2007

(54) CUTTING OR CRUSHING IMPLEMENT

(76) Inventor: Simon Robert Ward, 21 Arcadall St. Meadowbank, Auckland 1005 (NZ)

( * ) Notice: Subject to any disclaimer, the term of this patent is extended or adjusted under 35 U.S.C. 154(b) by 0 days.

(21) Appl. No.: 10/523,898

(22) PCT Filed: Aug. 6, 2003

(86) PCT No.: PCT/NZ03/00173

§ 371 (c)(1),
(2), (4) Date: Oct. 19, 2005

(87) PCT Pub. No.: WO2004/013417

PCT Pub. Date: Feb. 13, 2004

(65) Prior Publication Data

US 2006/0108462 A1    May 25, 2006

(30) Foreign Application Priority Data

Aug. 6, 2002    (NZ)    ..................... 520567

(51) Int. Cl.
*B02C 19/00* (2006.01)
(52) U.S. Cl. .................. 241/101.73; 241/266; 30/134; 30/228
(58) Field of Classification Search ................ 144/4.1, 144/34.1; 30/134, 228; 241/266, 101.73
See application file for complete search history.

(56) References Cited

U.S. PATENT DOCUMENTS

| 4,406,412 A | * | 9/1983 | Alexandersson ............. 241/36 |
| 5,183,216 A | | 2/1993 | Wack |
| 5,645,236 A | * | 7/1997 | Sugiura et al. ........ 241/101.73 |
| 6,129,298 A | | 10/2000 | Nye |

FOREIGN PATENT DOCUMENTS

| DE | 92 10 765 | 10/1992 |
| EP | 0 841 445 | 5/1998 |

OTHER PUBLICATIONS

Messerschmidt et al., Betonzangen Einleitung, vol. 42, No. 2, pp. 97-98, Apr. 2, 1995.

\* cited by examiner

*Primary Examiner*—Shelley M. Self
(74) *Attorney, Agent, or Firm*—Knobbe Martens Olson & Bear LLP

(57) ABSTRACT

A cutting implement (1) includes a plurality of sets of jaws (3) which cut a single length of material at a plurality of separate positions along the length of the material. A single actuation of the implement (1) causes each of the jaws (3) to at least partially and consecutively close. The consecutive closing of adjacent jaws (3) places a first jaw in a cutting configuration and a second, immediately adjacent jaw in a clamping configuration. The cutting implement (1) is connected to and actuated by the actuator arm of an excavator (9).

15 Claims, 2 Drawing Sheets

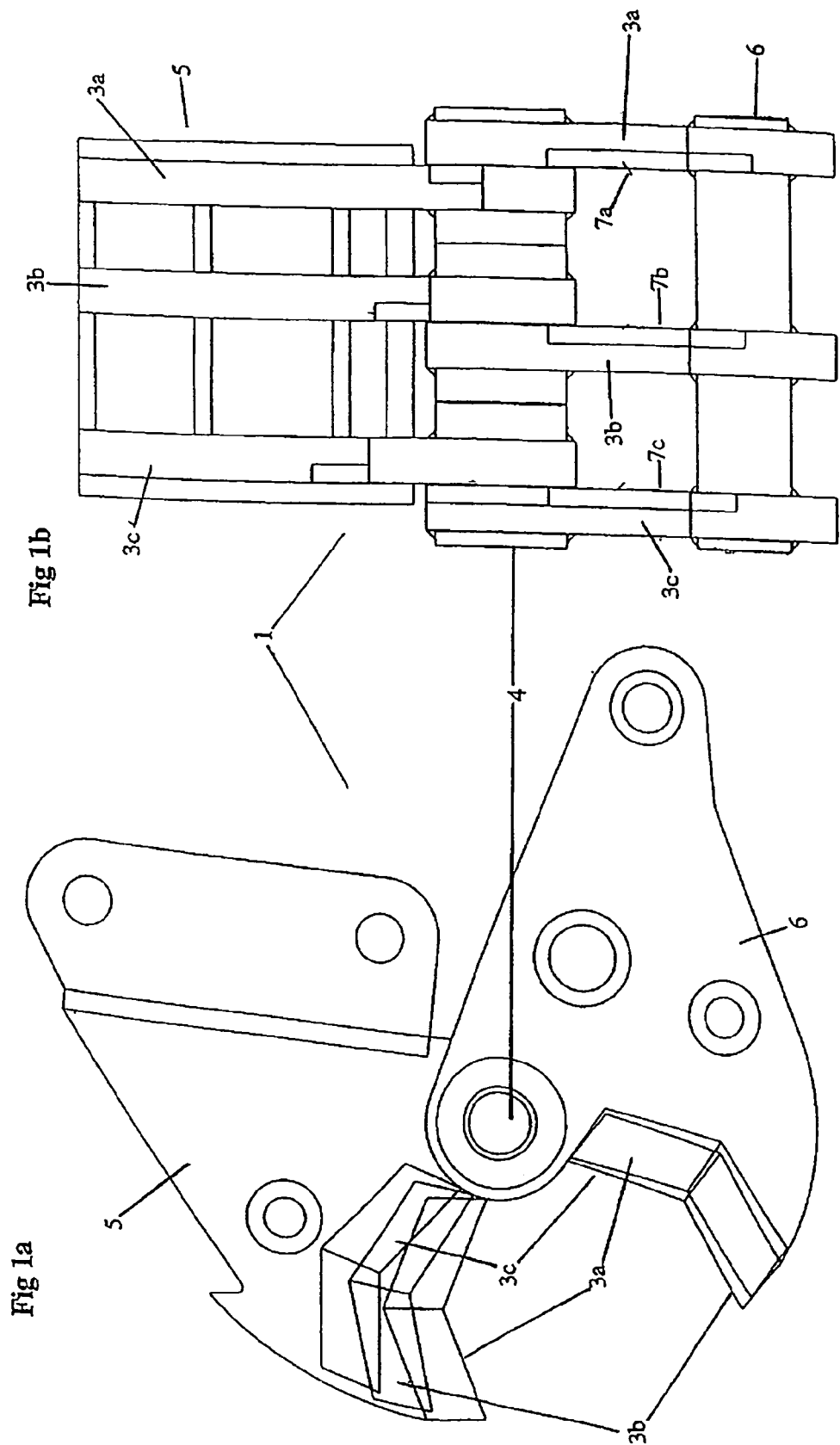

CUTTING OR CRUSHING IMPLEMENT

TECHNICAL FIELD

This invention relates to a cutting or crushing implement. Preferably the present invention may be adapted to provide a cutting or crushing implement which can be attached to and actuated by an excavator or other types of driving or earth working machinery. Those skilled in the art should appreciate however that other applications are envisioned for this invention and reference to the above applications only throughout this specification should in no way be seen as limiting.

BACKGROUND ART

In some instances there is a need to cut a length of material into a number of small, shortened portions. For example, in demolition or construction work, there is sometimes the need to cut long lengths of resilient material such as reinforcing steel into a number of smaller lengths. In the case of demolition work a large tangled mass of reinforcing steel remains after a concrete structure has been demolished. To dispose of these lengths of steel it is preferable to cut it into a large number of small pieces which can more easily be handled and/or transported and/or melted down than the original mass.

Cutting long lengths of material into smaller lengths, in effect, increases the overall density of the collected cut material, in that there is less air in the volume occupied by the material. By increasing its density this allows the material to be handled transported and disposed of both quickly and inexpensively.

One existing approach used to cut down such material is through the provision of a guillotine arrangement driven by some form of pneumatic or hydraulic ram. A length of the steel or other material to be cut is pulled or pushed through the guillotine jaw and the thre law is driven through the steel to complete the cut required. However, there are a number of problems associated with the use of this type of apparatus. Specifically, only a single cut can be made for each pass of the blade which can in turn slow down the cutting process. Furthermore, it can be difficult to manoeuvre portions of a bent mass of steel through the guillotine jaws provided, which again can complicate and slow down cutting work.

A number of other different types of cutting, crushing or manipulating jaws have also previously been developed which attach to an excavator or other similar types of heavy machinery. These attachments can normally connect to the free end of an excavator's working boom and can be operated or actuated through hydraulic rams supplied with pressurised hydraulic fluid from the excavator. However, there are a number of problems associated with these types of existing cutting or crushing implements when working with long lengths or tangled masses of material such as reinforcing steel. For example, the implements provided can only make a single cut through the length of material involved per operation or actuation of the implement. Furthermore after each cut the implement must again be re-aligned with the next portion of the material to make an additional cut. As the earlier cuts will bend or twist the length further, additional time will be required to realign and manoeuvre the implement back into position to make a subsequent cut.

These limitations make the cutting operation relatively slow and also can not necessarily guarantee that smaller lengths of material will be cut to a substantially uniform length or size. Operators of these excavators do not have fine control of the positioning of such implements, and as such, due to the need for realignment of the implement after each cut, different lengths of cut material will be produced.

It would be of advantage to have an improved shearing, cutting, crushing or pulverising apparatus or implement which addressed the above problems. It would be advantageous to have an apparatus or implement which could cut long lengths or tangled collections of material into a number of small lengths quickly and easily. It would also be advantageous if the smaller lengths cut were of a substantially uniform length.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to go at least some way towards addressing the foregoing problems or to at least to provide the industry with a useful choice.

Further aspects and advantages of the present invention will become apparent from the ensuing description which is given by way of example only.

According to one aspect of the present invention there is provided a cutting or crushing implement comprising:

a plurality of sets of Jaws, each set of jaws including opposing upper and lower jaws which are positioned side by side and are pivotatile about and displaced along a common axis, wherein adjacent upper and/or lower jaws are displaced relative to one another about said axis so that when operated the sets of jaws are together adapted to cut or crush a single length of material at a plurality of separate points along the length of said material, and whereby a single actuation of said implement is adapted to cause each of said sets of jaws to at least partially close in sequence.

According to a further aspect of the present invention there is provided a crushing or cutting implement substantially as described above wherein the consecutive closing of adjacent sets of jaws places a first set of jaws in a cutting or crushing configuration and a second immediately adjacent jaw in a substantially clamping configuration.

According to yet another aspect of the present invention there is provided a cutting or crushing implement substantially as described above wherein each of the plurality of sets of jaws includes at least one blade, wherein a leading edge of said at least one set of jaws' blade or blades is oriented opposite a leading edge of an immediately adjacent set of jaws' blade or blades.

According to another aspect of the present invention there is provided a cutting or crushing implement substantially as described above wherein said sets of jaws are adapted to pivot about a single common axis.

According to another aspect of the present invention there is provided a cutting or crushing implement substantially as described above wherein one jaw from each set of jaws is fixed relative to a common pivot axis.

According to another aspect of the present invention there is provided a cutting or crushing implement substantially as described above wherein each of the jaws fixed relative to the common pivot axis are fixed at a different angle about the axis.

An implement formed in accordance with the present invention may be any type of apparatus or arrangement of elements which is adapted to connect to an actuator arm, boom or any piece of machinery that can operate the implement. Preferably such implements may be configured to cut, crush, crack or shear a number of different types of materials. For example in some embodiments the present invention may be used in the demolition industry to provide an implement which can perform at least one of the above functions on a demolition site.

Preferably the driving equipment which the implement is adapted to connect to may be an excavator or any other similar type of heavy machinery. These types of machine are well known in the demolition, construction and materials recycling trades and as such will not be described in detail throughout this specification. Those skilled in the art should appreciate that reference to an excavator may encompass any type of machine which can be adapted to move or operate an implement configured in accordance with the present invention.

Reference throughout this specification will also be made to the implement being connected or attached to the actuator arm of an excavator. Excavators normally also include a hydraulic ram where the hydraulic fluid that operates the ram is supplied from the excavator. This ensures that a hydraulic ram can be used to actuate an implement formed in conjunction with the present invention.

However, those skilled in the art should also appreciate that the present invention need not necessarily be powered by a hydraulic ram and hydraulic fluid associated with an excavator. For example, in other embodiments, self-powered or self-driven implementations of the present invention may be provided. In such instances one or more independent driving rams or other similar driving apparatus may be provided as part of the implement, and used to operate or drive the jaws. This allows relatively large independent driving rams to be employed to cut through large, thick lengths of material if required.

Preferably the present invention is adapted to provide an implement to be attached to and operated by an excavator. This implement may be used to cut, crush or shear material easily and quickly through an operator manoeuvring the boom of the excavator and subsequently actuating the implement.

Reference throughout this specification will also be made to the implement provided being used preferably to cut through lengths of reinforcing steel bars. However, those skilled in the art should appreciate that further applications are envisioned for the present invention and reference to the above only throughout this specification should in no way be seen as limiting. For example, in other embodiments the implement may provide a crushing operation and need not necessarily be used with reinforcing steel only. Furthermore, reference to cutting of reinforcing steel bars only throughout this specification should in no way be seen as limiting. For example, in other embodiments copper, aluminium or other non-ferrous metals may also be cut or crushed as required or desired. Similarly, railway tracks or other castings may also be cut or crushed as required.

Preferably the implement provided may be adapted to cut a long length or tangled mass of reinforcing steel bars to a large number of smaller lengths. These small lengths can then be densely packed and easily collected, stored, transported and/or recycled.

Preferably the implement includes a plurality of sets of jaws. A jaw set may be formed by two opposed elements which are adapted to move together to cut or shear an item such as a length of steel. A plurality of sets of jaws may be provided to execute a plurality of cuts through the length of steel bar involved in one single operation or actuation of the implement. Furthermore, those skilled in the art should appreciate that the opposed members or elements of such sets of jaws need not necessarily be fully closed together in some instances to make the cut required. For example, in some implementations these jaw components may only need to at least partially close to complete the cut required.

Preferably each of the sets of jaws provided may act on or cut at a plurality of separate points along the length of the material involved. This in turn allows multiple cuts to be made to, for example, a length of steel with a single actuation of the implement provided. The operator of the implement preferably need only position the excavator and implement in place with the material to be cut between the jaws of the implement, and then actuate the implement once to make a number of controlled cuts through the material. Furthermore, upon a single actuation of the implement provided a substantial portion of the power supplied by the implement to the sets of jaws may be delivered to the jaw set presently in cutting into the length of material involved. In this way the force being applied to exercise a cut into a length of material may be maximised.

In a preferred embodiment each of the implement's jaws may be adapted to pivot closed to complete a cutting operation. Reference throughout this specification will also be made to the jaws provided being adapted to pivot together or closed to complete a cut. However, those skilled in the art should appreciate that other jaw configurations may be provided such as, for example, a guillotine type action, and reference to pivoting jaws only throughout this specification should in no way be seen as limiting.

Preferably a single actuation only of the implement will cause all of the sets of jaws provided to close. This allows a plurality of cuts to be made quickly and easily with the present invention. Furthermore, as each jaw set works or operates on a separate point of the length being cut, a number of smaller cut lengths are produced when the implement is actuated, where these lengths have a known size being equal to the distance between blades on immediately adjacent jaw sets. This allows a high degree of control to be provided with respect to the lengths cut using the present invention.

In one alternative embodiment the present invention may include a jaw displacement system which is adapted to modify, manoeuvre or change the distances between each adjacent jaw. By changing these width of distance values, the known size or length of the cuts being made can be modified or controlled. For example, in one embodiment, each jaw or jaw set may be attached to the main body of the implement through a connection to a positioning ram, whereby the position of the jaw or jaw set with respect to the main body of the implement is controlled by the displacement of a piston associated with this ram. Actuation of the piston can then control the position of the jaw with respect to the main body of the implement and hence the position of the jaw with respect to adjacent jaws.

Reference throughout this specification will be made to the distance between each of the jaw sets of the implement being fixed, but those skilled in the art should appreciate that other implementations of the present invention are envisioned and reference to the above only throughout this specification should in no way be seen as limiting.

In a further preferred embodiment each of the blades provided may pivot about a single common axis or rotatable shaft. This will place the ends or corners of each adjacent jaw set in an overlapping position, preferably with shims provided between each adjacent jaw. As the blades provided act on a common axis, this eliminates the possibility that with wear an uppermost portion of the jaw will fall out of alignment with the lower most portion and subsequently block the main body of the lower jaw.

Preferably the implement is configured to be actuated through the operation of a hydraulic ram associated with an excavator boom. This hydraulic ram can provide a driving actuation force where this force can in turn be transmitted directly to each of the plurality of blades provided within the implement. A single actuation of this ram will in turn trigger multiple cuts being made to a length of steel or other material.

Reference throughout this specification will also be made to the implement being actuated through a single operation of an excavator ram. However, as discussed above, in alternative embodiments the implements may include its own driving ram or other similar power system and need not necessarily rely on an excavator ram to be actuated.

In a preferred embodiment the implement may include three sets of jaws arranged along the central pivot axis. Three jaws may be provided to complete three distinct cuts through reinforcing steel bars or other types of material with a single actuation only of the implement. However, only two sets or more than three sets of jaws could be included.

Furthermore, closure of a jaw set refers to relative movement between the two jaws of a set, either because one jaw is moving while the other is stationary, or because both jaws are moving.

In a preferred embodiment the implement is configured so that when actuated each of the sets of jaws provided will close consecutively in a controlled staged manner. In this configuration of the invention a first or leading jaw set will close, to be followed consecutively by each following adjacent jaw set. This configuration of the invention will place a first jaw set of the implement in a cutting or crushing configuration and a second immediately adjacent jaw set in a clamping configuration. The first jaw set to move or close will in fact cut the length of material first, with the adjacent jaw set involved moving into a clamping position during closure of the first jaw set. While the first or initial jaw set is cutting, the second adjacent jaw (which is not fully closed) will grip and hold steady the following portion of the length of material being cut. For example, if reinforcing steel is to be cut, the second or immediately adjacent jaw set to the first or primary jaw set will hold the steel bar in place and prevent it from bending, twisting or warping when the first cut is made. Accordingly, at any moment in time, only one set of jaws is actually cutting or crushing so that maximum available power is used for cutting or crushing at each position.

Furthermore, this consecutive or serial or sequential or successive closing of each adjacent jaw set of the implement allows a plurality of cuts to be made while the material being cut is held securely in place. With the exception of the last cutting jaw set provided the material cut will be firmly clamped and prevented from bending or warping while cuts are being made.

In a preferred embodiment a single jaw set may be formed from two opposed substantially V shaped elements. The upper element or portion of the jaw may be formed from an inverted V shaped form, whereas the lower element may be formed from an upright V shaped form. The use of this specific shape of jaw elements aids in the clamping facility provided by the jaw adjacent to the current cutting jaw because four distinct contact points are provided by the closing jaw set in a clamping configuration to secure or clamp the material currently being cut by an immediately adjacent jaw set.

In a preferred embodiment each of the implement's jaw sets may include at least one blade, which in turn incorporates or forms a leading edge. A blade portion may be provided on either or both of the upper or lower jaw elements of a jaw set and can easily shear and cut through material placed within the set of jaws as the jaw is closed. Each of the blades with a leading edge then define a working face for a jaw, which in turn determines in what direction side loading forces are applied to the implement when material is cut by the jaw. As each jaw is squeezed closed through the material being cut, a resultant lateral or side force is applied to the jaw. The direction of the side loading force will then be determined by which side of the jaw the leading edge or edges of its blade or blades are provided.

In a further preferred embodiment the blade or blades of the jaw and their associated leading edges can be orientated to oppose the blade or blades and associated leading edges of an adjacent jaw. This configuration of the invention provides side load balancing through each jaw. A side load applied by a first jaw will in turn be opposed by the adjacent jaw involved, thereby cancelling out the net side load forces applied to the implement when in operation. These side load forces can be a balance for each adjacent set of jaws provided. Every odd numbered jaw can in turn be opposed or faced by every even number jaw provided within the implement.

The present invention provides many potential advantages over the prior art.

An implement formed in conjunction with the present invention can use a plurality of sets of jaws to make a number of cuts with a single actuation or operation of the implement. This can substantially speed up the cutting work required using such an implement.

Furthermore, due to the use of a plurality of sets of jaws, a controlled cut distance will be applied to produce a number of lengths of cut material with a known length. In one alternative embodiment, a jaw displacement system may be provided to modify the distances between each set of jaws and hence control the length of cut applied by the jaws with a single actuation of the implement in addition, the clamping facility provided by an adjacent set of jaws to the cutting jaw set minimises warping or bending of the material involved as it is cut.

The provision of opposed working faces of adjacent jaws also minimises and cancels out side loading of forces applied to the implement when operated. This can substantially increase the useful life span of the implement and potentially also reduce maintenance problems.

The consecutive motion applied to each adjacent jaw set means that the power developed and transmitted by the implement's driving power source is employed continuously to make a number of cuts. A relatively low power or low capacity driving ram may be used for example, which is continuously loaded as each consecutive cut is made. As the cuts required are staged, a relatively low power ram may be used in comparison with a high capacity high power ram which would be required if all buts were made at approximately the same time.

BRIEF DESCRIPTION OF DRAWINGS

Further aspects of the present invention will become apparent from the following description which is given by way of example only and with reference to the accompanying drawings in which:

FIGS. 1a and 1b show a side elevation and front view of a cutting or crushing implement formed in accordance with a preferred embodiment of the present invention.

BEST MODES FOR CARRYING OUT THE INVENTION

Figure 2B:
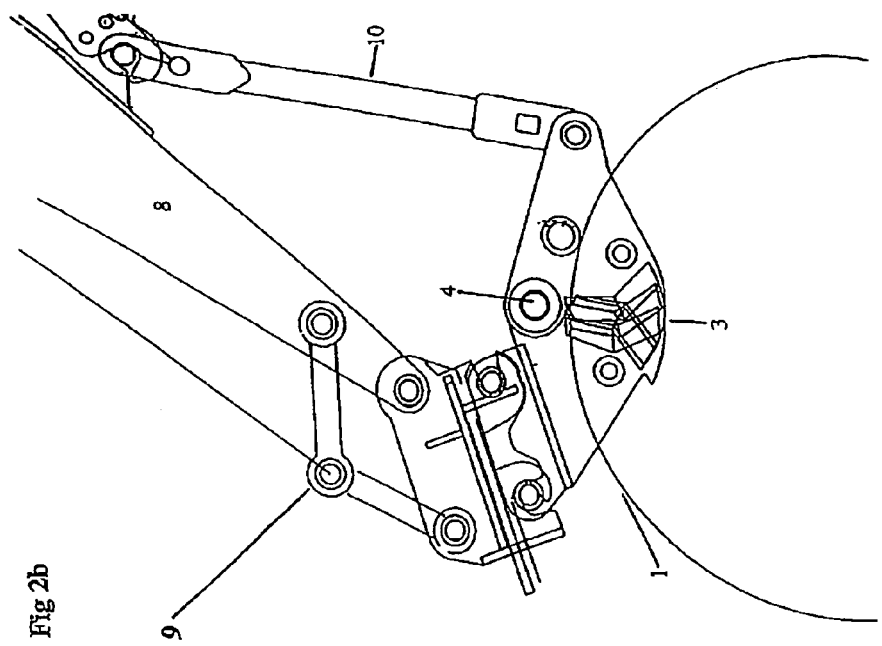
FIGS. 2a and 2b show the implement of FIGS. 1a and 1b when attached to an excavator and in use.

FIGS. 1a and 1b show a side elevation and front view of a cutting or crushing implement formed in accordance with a preferred embodiment of the present invention.

An implement 1 is shown in accordance with a preferred embodiment of the present invention. Implement 1 is adapted to be connected to the end of a boom 8 and working arm 9 of an excavator via strut 10, as shown and discussed in more detail below with respect to FIGS. 2a and 2b.

The implement 1 preferably includes three sets or pairs of jaws 3a, 3b, 3c (collectively 3). The lower portion of each set of jaws is provided with a V shape form, whereas the upper portion or element of each set of jaw is provided with an inverted V shape form.

Each of the sets of jaws 3 are connected and associated with a central pivot axis or rotatable shaft 4 of the implement. Each of the upper portions of the sets of jaws 3 are pivoted towards or away from the lower portions about this main pivot of the implement. Each of the upper and lower sections of the sets of jaws 3 are directly attached to an upper body portion 5 or lower body portion 6 of the implement respectively. When the upper body portion 5 is pivoted towards the lower portion 6 the three sets of jaws 3 are then pivoted towards one another and can be closed on one another to perform a cutting operation. A single actuation of the implement may perform three cutting operations through the movement of the upper portion 5 only and subsequent pivoting of the top portions of each of the sets of jaws 3a, 3b and 3c.

The jaws 3 are displaced across the width of the implement, so that a length of material inserted between the jaws will be cut at three distinct and separate points when it contacts each of the jaws 3.

As can be seen from FIG. 1a, a cut will only be completed when each jaw is fully closed, but in other embodiments of the present invention this may not necessarily be the case.

Each of the upper and lower sections of the jaws 3 are arrayed at off-set heights or angles with respect to one another to ensure that adjacent jaws close consecutively with respect to one another. This may be achieved by fixing the upper jaws of the sets together, at offset angles, or connecting each of the upper jaws to a shaft 4, at offset angles about the shaft in the instance shown the jaw set 3a will close first, followed by immediately adjacent jaw set 3b and finally jaw set 3c.

Initial actuation of implement 1 will push set of jaws 3a closed placing it in a cutting configuration, while in turn pushing set of jaws 3b at least partially dosed and therefore into a damping configuration. In this instance jaw 3b will hold and clamp a length of material while the material is being cut by jaw 3a. The same operation is then completed sequentially or consecutively in turn as jaw set 3b cuts through the same material in a cutting configuration, while jaw set 3c works in a damped configuration. Finally, jaw set 3c will close on the material to make a final cut through it.

Accordingly, after any jaw has finished clamping it will subsequently move through to cut the material involved. The operation of the jaws are staged, and each jaw will clamp and then subsequently cut through the material being worked by the implement.

FIG. 1b also shows how the working faces of adjacent sets of jaws may be oriented with respect to one another. Each of the bottom sections of the sets of jaws 3 include a blade portion 7a, 7b or 7c which presents a leading edge of the blade and subsequently defines a working face for the jaw involved.

Adjacent sets of jaws 3a and 3b have their working faces oriented opposite to one another to balance side loading forces applied to the implement when in use. The working face of set of jaws 3c is not aligned due to an odd number of jaws being provided with the implement shown in the example.

The working face of jaw set 3a will apply a lateral or side loading force in towards the centre of the implement, whereas the working face of jaw 3b applies the same force but in the opposite direction. This balancing of forces cancels out side loads applied to the implement by sets of jaws 3a and 3b.

Figure 2A:
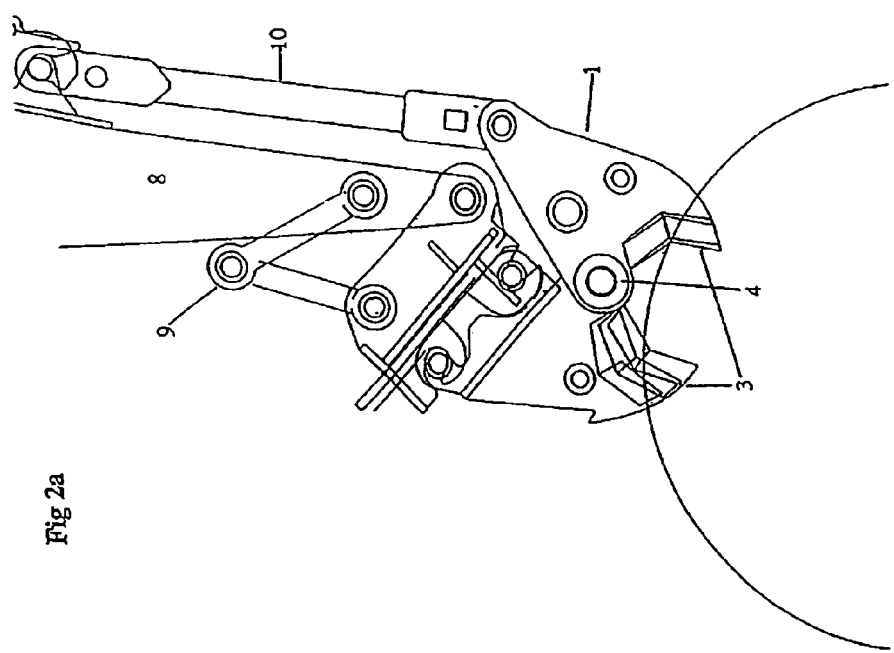

FIGS. 2a and 2b show the implement of FIGS. 1a, 1b when used. In the instance shown implement 4 is attached to the boom 8, driving arm 9 and strut 10 of an excavator.

FIG. 2a shows the jaws provided when fully open prior to a cutting operation, whereas FIG. 2b shows the jaws positioned after three cuts have been made. As can be seen from FIG. 2a in combination with FIG. 2b, a driving ram acting to push the driving arm 9 of the excavator will in turn pivot top portions of the sets of jaws 3 about the central axis 4 to close the jaws and complete a cutting operation. A single actuation of the implement will then result in three separate but consecutive cuts to be made to a length of material placed between the jaws 3.

Aspects of the present invention have been described by way of example only and it should be appreciated that modifications and additions may be made thereto without departing from the scope thereof as defined in the appended claims.

The invention claimed is:

1. A cutting implement comprising:
a plurality of sets of jaws, each set of jaws including opposing upper and lower jaws which are positioned side by side and are pivotable about and displaced along a common axis,
wherein adjacent upper and lower jaws are displaced relative to one another about said axis so that when operated the sets of jaws are together adapted to cut a single length of material at a plurality of separate points along the length of said material, and whereby a single actuation of said implement is adapted to cause each of said sets of jaws to at least partially close in sequence, and wherein at least one of the upper and lower jaws from each set of jaws is fixed, the fixed jaws being fixed at a different angle relative to a common pivot axis.

2. A implement as claimed in claim 1, wherein the consecutive closing of adjacent sets of jaws places a first set of jaws in a cutting configuration and a second immediately adjacent set of jaws in a substantially clamping configuration.

3. A cutting implement as claimed in claim 1, wherein said sets of jaws are adapted to pivot closed to complete a cutting or shearing operation.

4. A cutting implement as claimed in claim 1, wherein a single actuation of the implement is capable of causing all of the sets of jaws to close.

5. A cutting implement as claimed in claim 1, which is configured to be actuated through the operation of a hydraulic ram associated with machinery to which the implement is attached.

6. A cutting implement as claimed in claim 1, wherein each set of jaws is formed by two opposing jaws elements which are adapted to move together to cut, crack or shear a length of material.

7. A cutting implement as claimed in claim 1, wherein the plurality of sets of jaws are adapted to each execute a separate cut through a length of material in a single actuation of the implement.

8. A cutting implement as claimed in claim 1, wherein each of the sets of jaws are adapted to close at separate positions along the length of the material.

9. A cutting implement as claimed in claim 1, wherein each jaw set is formed from two opposed V-shaped jaw elements.

10. A cutting implement as claimed in claim 1, wherein each jaw includes at least one blade, wherein each blade incorporates a leading edge.

11. A cutting implement as claimed in claim 10, wherein the leading edge of each blade is oriented opposite to a leading edge of an immediately adjacent jaw's blade or blades.

12. A cutting implement as claimed in claim 1, which is configured to connect to machinery adapted to operate the implement.

13. A cutting implement as claimed in claim 1, which is adapted to connect to the actuator arm of an excavator.

14. A cutting implement as claimed in claim 1, which are adapted to cut, crack or shear a variety of different types of material.

15. A cutting implement as claimed in claim 13, which includes a driving ram adapted to operate in conjunction with the excavator to pivot top portions of the sets of jaws about a single common axis to close the jaws and complete a cutting operation.

* * * * *

UNITED STATES PATENT AND TRADEMARK OFFICE
CERTIFICATE OF CORRECTION

| | |
|---|---|
| PATENT NO. | : 7,306,177 B2 |
| APPLICATION NO. | : 10/523898 |
| DATED | : December 11, 2007 |
| INVENTOR(S) | : Simon Robert Ward |

It is certified that error appears in the above-identified patent and that said Letters Patent is hereby corrected as shown below:

In Column 1, Line 32, delete "handled" and insert --handled,--, therefor.

In Column 1, Line 38, after "and the" delete "thre law" and insert --jaw--, therefor.

In Column 2, Line 40, below "only." insert --DISCLOSURE OF INVENTION--.

In Column 2, Line 45 (Approx.), delete "pivotatile" and insert --pivotable--, therefor.

In Column 4, Line 59, delete "of" and insert --or--, therefor.

In Column 6, Line 54, delete "implement in" and insert --implement. In--, therefor.

In Column 7, Line 4, delete "buts" and insert --cuts--, therefor.

In Column 8, Line 7, delete "damped" and insert --clamped--, therefor.

In Column 9, Line 1, in Claim 2, after "A" insert --cutting--.

Signed and Sealed this
Twenty-second Day of February, 2011

David J. Kappos
*Director of the United States Patent and Trademark Office*